United States Patent
Machacek et al.

(10) Patent No.: US 11,237,805 B2
(45) Date of Patent: Feb. 1, 2022

(54) TECHNIQUES FOR AUTOMATICALLY DETECTING PROGRAMMING DEFICIENCIES

(71) Applicant: DISNEY ENTERPRISES, INC., Burbank, CA (US)

(72) Inventors: Jan Machacek, Manchester (GB); Anirvan Chakraborty, Wilmslow (GB); Christian Villoslada, Ho-Ho-Kus, NJ (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 16/506,666

(22) Filed: Jul. 9, 2019

(65) Prior Publication Data
US 2021/0011695 A1  Jan. 14, 2021

(51) Int. Cl.
*G06F 8/41* (2018.01)
*G06N 20/00* (2019.01)
*G06F 8/71* (2018.01)

(52) U.S. Cl.
CPC ............... *G06F 8/427* (2013.01); *G06F 8/71* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 9,880,834 B2* | 1/2018 | Sakamoto | G06F 8/751 |
| 10,114,624 B1* | 10/2018 | Makkar | G06F 8/311 |
| 10,191,737 B2* | 1/2019 | Suri | G06F 8/75 |
| 10,664,383 B2* | 5/2020 | Saha | G06F 11/3664 |
| 10,782,946 B2* | 9/2020 | Makkar | G06F 8/447 |
| 2008/0320445 A1* | 12/2008 | Rosado | G06F 9/453 717/110 |

(Continued)

OTHER PUBLICATIONS

M. White, M. Tufano, C. Vendome and D. Poshyvanyk, "Deep learning code fragments for code clone detection," 2016 31st IEEE/ACM International Conference on Automated Software Engineering (ASE), Singapore, 2016, pp. 87-98.*

(Continued)

*Primary Examiner* — Philip Wang
(74) *Attorney, Agent, or Firm* — Artegis Law Group, LLP

(57) ABSTRACT

A quality control (QC) engine analyzes sample code provided by a user and then generates example code that more effectively performs the same or similar operations performed by the sample code. An objective model analyzes the sample code to generate one or more tags indicating the intended objective(s) of the sample code. The quality model analyzes the sample code to generate one or more ratings indicating the degree to which the sample code achieves each intended objective. The performance model analyzes the tags and the ratings and estimates the performance of the sample code when executed in a production environment. The recommendation engine queries a database of code based on the tags, the ratings, and the estimated performance of the sample code to determine example code that achieves the same or similar objectives(s) as the sample code, but with at least one of higher ratings and greater performance.

21 Claims, 6 Drawing Sheets

(56) References Cited

U.S. PATENT DOCUMENTS

| | | | | |
|---|---|---|---|---|
| 2011/0246968 | A1* | 10/2011 | Zhang | G06F 8/751 |
| | | | | 717/125 |
| 2012/0159434 | A1* | 6/2012 | Dang | G06F 8/36 |
| | | | | 717/120 |
| 2015/0339104 | A1* | 11/2015 | Frenkiel | G06F 9/44 |
| | | | | 717/113 |
| 2015/0355998 | A1* | 12/2015 | Kogan-Katz | G06F 8/71 |
| | | | | 717/101 |
| 2016/0357519 | A1* | 12/2016 | Vargas | G06F 9/451 |
| 2017/0185783 | A1* | 6/2017 | Brucker | H04L 63/1433 |
| 2018/0349105 | A1* | 12/2018 | Makkar | G06F 8/36 |
| 2019/0079741 | A1* | 3/2019 | Makkar | G06F 8/75 |
| 2019/0079753 | A1* | 3/2019 | Makkar | G06F 8/36 |
| 2019/0079754 | A1* | 3/2019 | Makkar | G06N 5/022 |
| 2019/0171422 | A1* | 6/2019 | Udupa | G06F 8/31 |
| 2019/0179953 | A1* | 6/2019 | Kline | G06F 16/9535 |
| 2019/0180030 | A1* | 6/2019 | Wei | G06F 21/566 |
| 2020/0249919 | A1* | 8/2020 | Makkar | G06F 8/36 |
| 2020/0264870 | A1* | 8/2020 | Makkar | G06F 40/30 |
| 2020/0293291 | A1* | 9/2020 | Guan | G06F 8/41 |
| 2020/0293433 | A1* | 9/2020 | Makkar | G06F 8/73 |

OTHER PUBLICATIONS

"D3.js-Data-Driven Documents", URL: https://d3js.org/, retrieved on Apr. 9, 2020, 7 pages.
"Deeplearning4j", URL:https://deeplearning4j.org/, retrieved on Apr. 9, 2020, 3 pages.
"Google News word vector model", URL: https://code.google.com/archive/p/word2vec/, retrieved on Apr. 9, 2020, 7 pages.
"Large Movie Review Dataset", URL: https://ai.stanford.edu/~amaas/data/sentiment/, retrieved on Apr. 9, 2020, 1 page.
Macháček et al., "Protocol chaos", URL: https://gentlemancoder.io/protocol-chaos/txt/root.pdf, 5 pages.
"Parallel coordinates—Wikipedia", URL: https://en.wikipedia.org/wiki/Parallel_coordinates, 6 pages.
"Protocol Buffers", URL: https://developers.google.com/protocol-buffers, retrieved on Apr. 9, 2020, 1 page.
"R: The R Project for Statistical Computing", URL: https://www.r-project.org, retrieved on Apr. 9, 2020, 2 pages.
"ScalaPB", URL: https://github.com/scalapb/ScalaPB, retrieved on Apr. 9, 2020, 4 pages.
"Shiny", URL: https://shiny.rstudio.com, retrieved on Apr. 9, 2020, 6 pages.
"Stack Exchange Data Explorer", URL: https://data.stackexchange.com, retrieved on Apr. 9, 2020, 22 pages.
"Stack Overflow", URL: https://stackoverflow.com, retrieved on Apr. 9, 2020, 10 pages.

* cited by examiner

TECHNIQUES FOR AUTOMATICALLY DETECTING PROGRAMMING DEFICIENCIES

BACKGROUND

Field of the Various Embodiments

The various embodiments relate generally to computer programming and software development and, more specifically, to techniques for automatically detecting programming deficiencies.

Description of the Related Art

Software engineering projects typically occur in two distinct phases, commonly referred to as the "development" phase and the "production" phase. In the development phase, a computer programmer writes code for a software application using a development environment. The development environment includes computational resources that the computer programmer can use to test whether the software application meets various design objectives specified for the development phase. Once the software application is determined to meet the design objectives, the software engineering project moves to the production phase. In the production phase, the software application is deployed within a production environment that includes computational resources that users can use to access the software application.

In most software engineering projects, the development and production phases described above usually occur iteratively. During a given iteration of the development phase, the computer programmer may encounter a programming problem that lacks a clear solution. In such situations, the computer programmer may implement code that only appears to address the programming problem. Alternatively, the computer programmer may utilize Internet resources to search for third-party code that potentially addresses the programming problem. Both approaches may result in code that appears to address the original problem, but may inadvertently bring in a hidden defect into the codebase. The third-party code is usually copied directly into the software application and then tested to confirm that the third-party code has sufficiently addressed the programming problem. After completing the iteration of the development phase, the software application, including the third-party code, is deployed to the production environment as part of a subsequent iteration of the production phase. Both situations result in underperforming or "naïve" code being added to the system.

One drawback of the above approach is that such naïve code is oftentimes able to perform adequately in a development environment but is not robust enough for deployment within a production environment. Consequently, a computer programmer who incorporates naïve code into a software application can inadvertently introduce programming bugs into the software application that may not become apparent until the software application is deployed to users. Such programming bugs can cause the software application to behave unpredictably or even crash. Further, because the computer programmer did not write the third-party code, or because the programmer has missed subtle details in the implementation, the computer programmer usually has a limited understanding of how to repair the programming bugs. As a result, the software application can be unavailable to consumers for extended periods of time while the computer programmer debugs the software application.

As the foregoing illustrates, what is needed in the art are more effective techniques for controlling the quality of code generated during software engineering projects.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
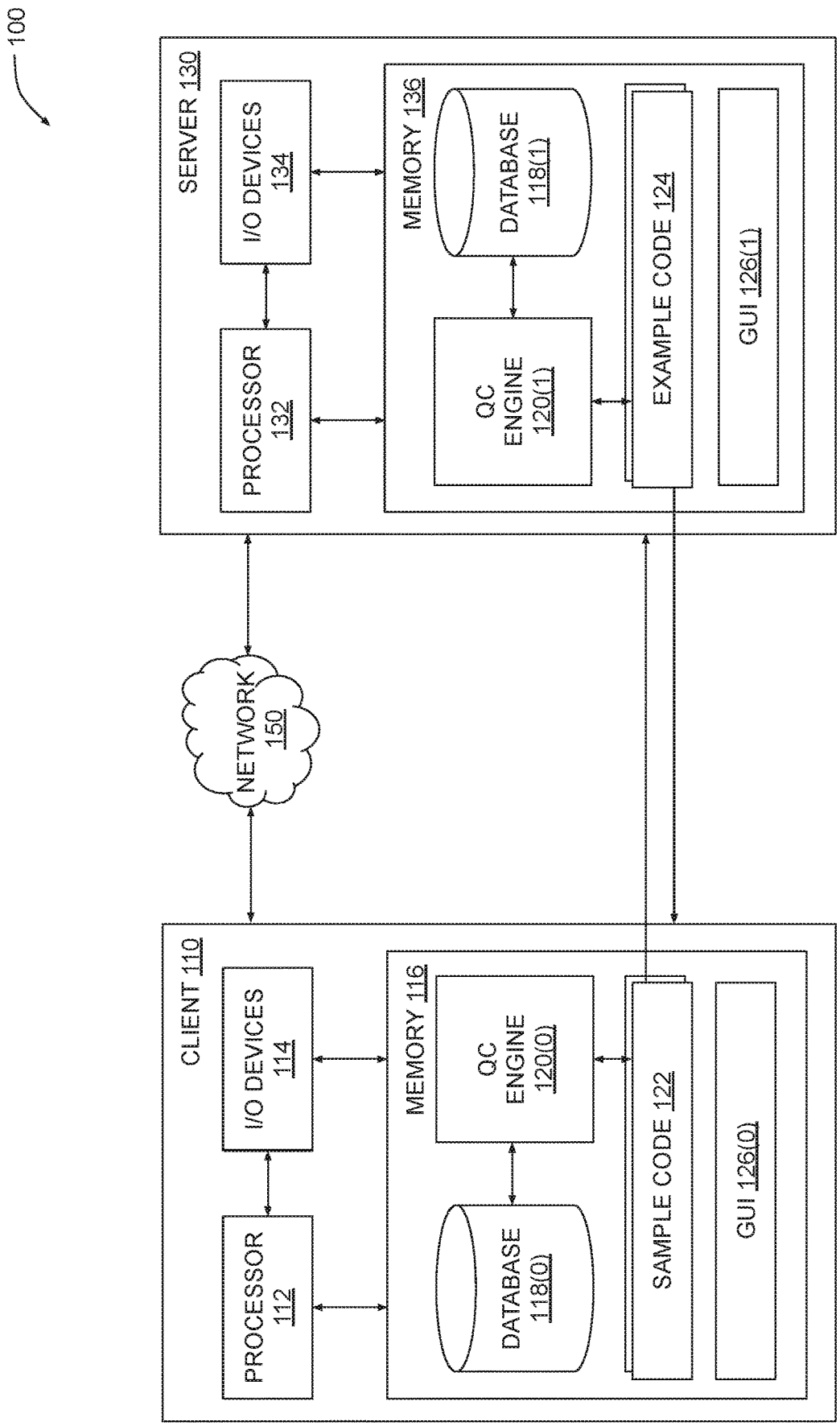
FIG. 1 illustrates a system configured to implement one or more aspects of the present embodiments.

In the following description, numerous specific details are set forth to provide a more thorough understanding of the various embodiments. However, it will be apparent to one of skilled in the art that the inventive concepts may be practiced without one or more of these specific details.

As noted above, when developing a software application, a computer programmer may encounter a programming problem that the computer programmer does not know how to address. In this situation, the computer programmer sometimes decides to implement a "naïve" solution that appears to address the programming problem but may not entirely address the programming problem. Alternatively, the computer programmer may locate third-party code in the public domain that similarly appears to address the programming problem but may not entirely address the programming problem. A naïve solution appears to the programmer to address the original problem entirely, but usually includes one or more technical flaws that are not immediately apparent. Such technical flaws may include security vulnerabilities, performance bottlenecks, or otherwise unsafe or unmaintainable code. The same concerns apply to the third-party code: the third-party code may function adequately in a development environment but can subsequently fail to operate properly when incorporated into the software application and deployed to a production environment, thereby preventing consumers from using the software application. Furthermore, because the computer programmer did not write the third-party code, or because the programmer did not consider one or more corner cases in the naïve code, the computer programmer may not be able to repair the software application; or the effort required to effect such repair may be unusually large.

To address these issues, various embodiments include a quality control (QC) engine that analyzes sample code provided by a user and then generates references to example code that more effectively performs the same or similar operations performed by the sample code. The QC engine includes an objective model, a quality model, a performance model, and a recommendation engine. The objective model analyzes the sample code to generate one or more tags indicating the intended objective(s) of the sample code. The quality model analyzes the sample code to generate one or more ratings indicating the degree to which the sample code achieves each intended objective. The performance model analyzes the tags and the ratings and estimates the performance of the sample code when executed in a production environment. The recommendation engine queries a database of code based on the tags, the ratings, and the estimated performance of the sample code to determine references to example code that achieves the same or similar objectives(s) as the sample code, but with at least one of higher ratings and greater performance. The reference to the example code is provided to the user as a guidepost for writing higher-quality code with greater performance.

At least one technological advantage of the disclosed techniques relative to the prior art is that the disclosed techniques enable at least one of higher quality code and higher performance code to be generated when developing software applications. Among other things, the resulting code is less likely to contain programming bugs that potentially reduce performance when deployed to a production environment. In addition, the disclosed techniques provide computer programmers with more understanding about how to improve code that has been predicted to perform poorly, thereby enabling computer programmers to debug software applications more quickly and more preemptively than is possible with prior art approaches. These technological advantages represent one or more technological advancements over prior art approaches.

System Overview

FIG. 1 illustrates a system configured to implement one or more aspects of the present embodiments. As shown, a system 100 includes one or more clients 110 and one or more servers 130 coupled together via a network 150. A given client 110 or a given server 130 may be any technically feasible type of computer system, including a desktop computer, a laptop computer, a mobile device, a virtualized instance of a computing device, a distributed cloud-based computer system, and so forth. Network 150 may be any technically feasible set of interconnected communication links, including a local area network (LAN), wide area network (WAN), the World Wide Web, or the Internet, among others.

As further shown, client 110 includes a processor 112, input/output (I/O) devices 114, and a memory 116, coupled together. Processor 112 includes any technically feasible set of hardware units configured to process data and execute software applications. For example, processor 112 could include one or more central processing units (CPUs). I/O devices 114 include any technically feasible set of devices configured to perform at least one of input and output operations. For example, I/O devices 114 could include at least one of a display device, a keyboard, and a touchscreen, among others. Memory 116 includes any technically feasible storage media configured to store data and software applications. For example, memory 116 could include at least one of a hard disk, a random-access memory (RAM) module, and a read-only memory (ROM), among others. Memory 116 stores a database 118(0), a quality control (QC) engine 120(0), sample code 122, and a graphical user interface (GUI) 126(0).

Database 118(0) is configured to store program code and various metadata associated with that program code. For example, database 118(0) could store one or more Git repositories and associated metadata. QC engine 120(0) is a software application that, when executed by processor 112, interoperates with a corresponding software application executing on server 130 to analyze sample code 122, as described in greater detail below. Sample code 122 includes a set of instructions written in any technically feasible programming language that can be executed to perform one or more operations. GUI 126(0) includes graphical elements that can be displayed to the user via a display device. During operation, QC engine 120(0) obtains sample code 122 from a user via GUI 126(0) and transmits sample code 122 to server 130 for analysis and subsequent reporting on the results of that analysis. In one embodiment, QC engine 120(0) obtains sample code 122 from a non-GUI interface, such as a textual interface, a reference, a filesystem, and so forth. As a general matter, the QC engine 120(0) delivers results to one or more output devices, such as, for example, a human- or computer-consumable output.

Server 130 includes a processor 132, I/O devices 134, and a memory 136, coupled together. Processor 132 includes any technically feasible set of hardware units configured to process data and execute software applications, such as one or more CPUs. I/O devices 134 include any technically feasible set of devices configured to perform at least one of input and output operations, such as a display device, a keyboard, or a touchscreen. Memory 136 includes any technically feasible storage media configured to store data and software applications, such as a hard disk, a RAM module, or a ROM. Memory 136 includes a database 118(0), a QC engine 120(1), example code 124, and GUI 126(1). Database 118(1) is configured to store program code and various metadata associated with that program code, similar to database 118(0). QC engine 120(1) is a software application that, when executed by processor 132, interoperates with QC engine 120(0) discussed above.

In particular, QC engine 120(1) obtains sample code 122 from QC engine 120(0) and analyzes sample code 122 to generate a set of tags that describe one or more objectives associated with sample code 122. For example, QC engine 120(1) could perform an inference operation or alternative Machine Learning operation to generate a set of tags that represent one or more low-level functions sample code 122 performs or one or more high-level operations associated with sample code 122. In various embodiments, QC engine 120(1) may examine a collection of source code by slicing the source code into multiple variable-length windows, and then use a previously-trained sequence-to-vec model to determine which tags to apply to the source code window. In one embodiment, a given tag may indicate one or more purposes sample code 122 is meant to accomplish. QC engine 120(1) further analyzes sample code 122 to assign a rating to each tag. For example, QC engine 120(1) could perform an inference operation or alternative Machine Learning operation to assign a rating to a given tag indicating the degree to which sample code 122 performs a given function or operation associated with that tag.

Based on the generated tags and corresponding ratings, QC engine 120(1) then estimates the performance of sample code 122 in a production environment. For example, QC engine 120(1) could perform an inference operation or other Machine Learning operation to predict the number of errors that could occur should sample code 122 be deployed to the production environment. To make this prediction, QC engine 120(1) uses the set of tags and ratings in sample code 122 and compares them to similarly tagged and rated code associated with known production data. Finally, QC engine 120(1) suggests example code 124 that achieves similar objectives based on the tags, ratings, and performance data generated for sample code 122 and which has been previously submitted by another user. Example code 124 includes instructions that, when executed, achieve similar objectives as sample code 122 but have at least one of higher ratings and better performance than sample code 122. QC engine 120(1) transmits example code 124 to the user for display via GUI 126(0) to help guide the user in writing more robust and performant code. Example code 124 can, at the discretion of the user, be used to replace sample code 122.

As a general matter, database 118(0) and 118(1) represent separate portions of a distributed storage entity. Thus, for simplicity, databases 118(0) and 118(1) are collectively referred to hereinafter as database 118. Similarly, QC engine 120(0) and QC engine 120(1) represent separate portions of a distributed software entity that is configured to perform any and all of the inventive operations described herein. Thus, for simplicity, QC engines 120(0) and 120(1) are collectively referred to hereinafter as QC engine 120. Likewise, GUIs 126(0) and 126(1) represent different instances of a distributed GUI that is referred to hereinafter as GUI 126. The various operations performed by QC engine 120 when analyzing sample code 122 and generating example code 124 are described in greater detail below in conjunction with FIGS. 2-6.

Software Overview

Figure 2:
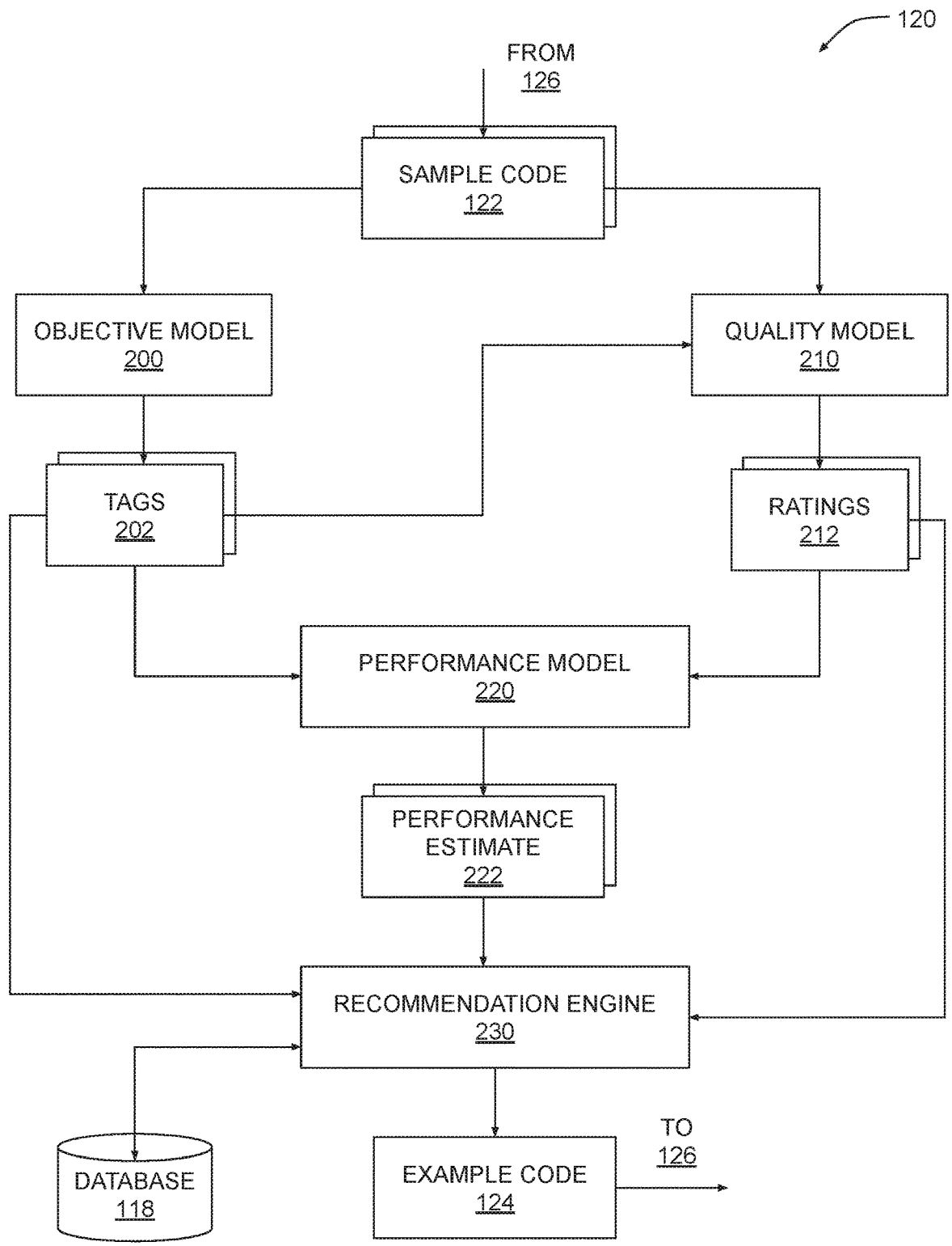
FIG. 2 is a more detailed illustration of the quality control engine of FIG. 1, according to various embodiments.

FIG. 2 is a more detailed illustration of the quality control engine of FIG. 1, according to various embodiments. As shown, QC engine 120 includes an objective model 200, a quality model 210, a performance model 220, and a recommendation engine 230. Objective model 200, quality model 210, and performance model 220 are predictive classifiers that are trained, based on various types of training data, to perform different classification procedures relative to sample code 122. Performance model 220 is generally a Machine Learning model that is modified via training to increase the accuracy with which the performance of code can be predicted. In one embodiment, performance model 220 may be an artificial neural network. The training of objective model 200, quality model 210, and performance model 220 is described in greater detail below in conjunction with FIGS. 3, 4, and 5, respectively.

The various models described herein are typically trained asynchronously, using code and accompanying text obtained from Q&A systems. The accompanying text represents human interpretation of the matching code, and thus can be considered a good representation of human knowledge about the code. The trained model can perform a code review task that a human programmer would do, but using much larger knowledge-base. The models, once trained on this Q&A dataset, can be used repeatedly to repeatedly perform code reviews on submitted source code examples, in effect automating detection of programming deficiencies. Moreover, this approach offers an overview of the entire codebase analyzed; offering an enterprise-wide (if used in an enterprise), or potentially world-wide comparison. QC engine 120 can offer suggestions to the programmers of where to look to find a better approach at solving a particular problem.

In operation, objective model 200 analyzes sample code 122 to generate tags 202. For example, objective model 200 could be an artificial neural network that performs an inference operation via a set of neural network layers to assign a probability value to each possible tag. A given tag 202 indicates a particular objective that sample code 122 performs to some degree. For example, a given tag 202 could indicate that sample code 122 establishes a database connection, performs a non-blocking HyperText Transfer Protocol (HTTP) request, spawns a plurality of parallel threads, connects to a remote server, and so forth. Tags 202 can further describe other attributes of sample code 122, including a programming language used to write sample code 122, one or more libraries implemented in sample code 122, and so forth. Objective model 200 provides tags 202 to quality model 210, performance model 220, and recommendation engine 230. In one embodiment, QC engine 120 stores tags in a database as pointers to the appropriate window of the analyzed source code and the detected tags.

In conjunction with the operation of objective model 200, quality model 210 analyzes sample code 122 and generates a rating 212 for each tag 202. A given rating 212 is a value that indicates the degree to which sample code 122 achieves the objective associated with the corresponding tag 202. The degree to which sample code 122 achieves the objective may indicate the technical elegance or rigorousness of sample code 122. Technical elegance and rigorousness, in turn, can indicate how well the code might perform in a production environment, where low scores typically suggest at least one of poor performance, unpredictable behavior, and low maintainability, and high scores typically indicate good performance, very little unpredictable behavior, and easy maintainability. The technical elegance and rigorousness are extracted by measuring the sentiment of the text accompanying the source code in the Q&A examples. QC engine 120 generally uses a hierarchy of heuristic rules (e.g. scans for the word "error", or "exception"), and a well-known sentiment-detection algorithms to determine whether the source code associated with the code human text represents a good or bad programming approach In exemplary operation of quality model 210, suppose objective model 200 generates a tag 202 indicating that one objective of sample code 122 is to parse an extensible markup language (XML) file. Quality model 210 could generate a rating 212 corresponding to that tag 202 that quantifies how effectively sample code 122 parses XML files. Quality model 210 can generate ratings using a variety of techniques, once quality model 210 is trained. For example, quality model 210 could perform an inference operation via an artificial neural network to assign a probability value that a given rating corresponds to a given tag. The process to generate the tags applies previously trained quality model 210 to portions of source code examples submitted for analysis; the model provides the mapping from source code to the pair of tag, quality; where the tag identifies the concept that the source code solves (e.g. parse XML), and the quality is the combination of heuristic and sentiment-analysis of the accompanying text in the training set. Conceptually, a given rating 212 quantifies the quality of a particular functional aspect of sample code 122. In one embodiment, quality model 210 may determine a given rating for a given tag based on a number of keywords (or other syntactic elements) appearing in sample code 122 that are associated with the given tag. Quality model 210 transmits ratings 212 to performance model 220 and recommendation engine 230.

Performance model 220 analyzes tags 202 and ratings 212 and then generates performance estimate 222. For example, performance model 220 could evaluate a parametric equation based on one or more parametric values that have been modified, via training, to cause the parametric equation to provide accurate performance estimates. Performance estimate 222 includes one or more quantities that represent the predicted performance of sample code 122 when executed in a production environment. For example, performance estimate 222 could include an estimated number of incidents predicted to occur during execution of sample code 122 in the production environment, an estimated amount of downtime predicted to occur during execution of sample code 122 in the production environment, and so forth. Performance model 220 transmits performance estimate 222 to recommendation engine 230.

Recommendation engine 230 obtains tags 202, ratings 212, and performance estimate 222 associated with sample code 122 and then queries database 118 to generate example code 124. Database 118 includes a vast collection of code and corresponding tags and ratings that are generated via objective model 200 and quality model 210, respectively, in the manner described above. For a given portion of code, database 118 also includes performance data describing the performance of the given portion of code when tested or executed in a production environment. Example code 124 is generally associated with a similar set of tags as sample code 122. However, example code 124 performs the various objectives described by those tags with at least one of better ratings and better performance than sample code 122. It is possible that sample code 124 example implements one concept exceptionally well, but another concept exceptionally badly. Because the analysis is performed on windows of code (essentially selections of several source code lines), the system is able to point to specific portions of a source code example. This is particularly important for large source code examples, which may contain thousands of lines. Accordingly, example code 124 generally represents a higher-quality version of sample code 122 that may perform better than sample code 122 in a production environment. In one embodiment, recommendation engine 230 may combine one or more metrics and then evaluate example code 124 based on a combined metric to determine whether example code 124 is more performant than sample code 122 and should be recommended. Recommendation engine 230 transmits example code 124 to the user to help guide the user in producing high-quality code that is more likely to perform well in production. In some cases, example code 124 can be implemented in place of sample code 122 with little or no modification.

In one embodiment, database 118 may include code associated with an organization to which the user belongs. For example, database 118 could include one or more code repositories associated with a private company where user participates in software engineering projects. In another embodiment, database 118 may include publicly available code that is not specifically associated with any single organization. For example, database 118 could include one or more code repositories associated with a large number of users with no specific relation to one another. In either case, the disclosed techniques provide users with effective tools for sharing high-quality knowledge related to solving computer programming problems. Database 118 is generally populated with code and corresponding tags, ratings, and performance data during training of objective model 200, quality model 210, and performance model 220. The training of these three models is described in greater detail below.

Model Training Overview

Figure 3:
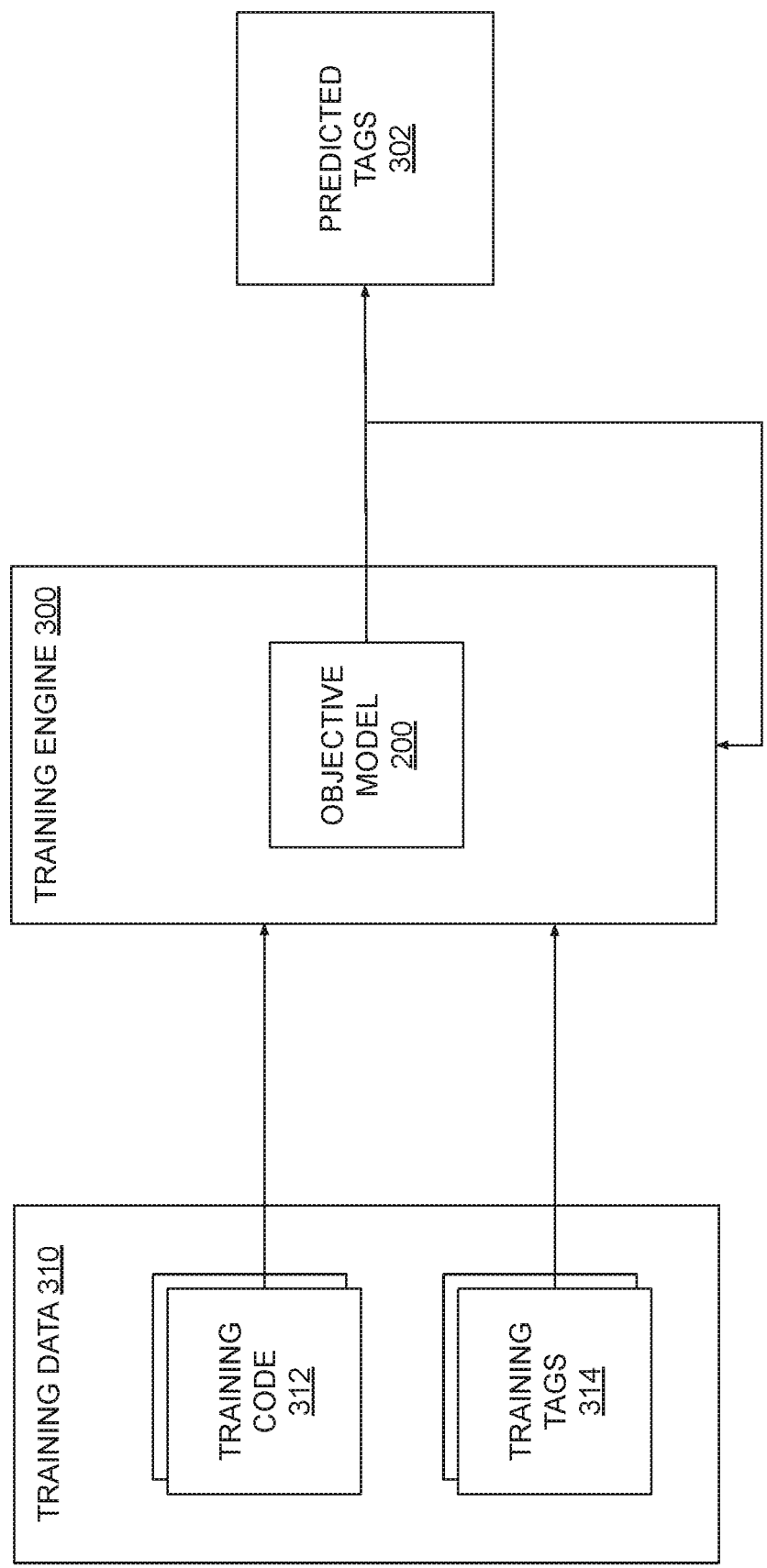
FIG. 3 illustrates how the objective model of FIG. 2 is generated via a series of training operations, according to various embodiments.

FIG. 3 illustrates how the objective model of FIG. 2 is generated via a series of training operations, according to various embodiments. As shown, a training engine 300 is configured to train objective model 200 based on training data 310. Training data 310 includes training code 312 and training tags 314. Training code 312 includes snippets of code that perform various operations. Training tags 314 describe attributes of those various operations, including one or more objectives associated with training code 312. For example, a given portion of training code 312 could parse a file using a regular expression and a corresponding tag 314 could include the text "regex parsing" to describe that the portion of training code 312 is meant to perform a regex parsing operation.

In one embodiment, training data 310 may be sourced from publicly accessible question and answer (Q&A) websites that allow users to ask programming questions and obtain information and examples of code in response from the wider programming community. A given Q&A website may provide users with access to individual programming questions and associated source code and one or more user-generated tags associated with those programming questions and source code.

During training, training engine 300 causes objective model 200 to analyze training code 312 and generate predicted tags 302. Training engine 300 compares predicted tags 302 to training tags 314 to determine the degree to which predicted tags 302 are similar to training tags 314 for a given portion of training code 312. Training engine 300 then modifies objective model 200 in order to reduce an error or difference between predicted tags 302 and training tags 314. As a general matter, objective model 200 is a Machine Learning model that can be modified, via training engine 300, to increase the accuracy with which objective model 200 classifies portions of code using tags.

In one embodiment, objective model 200 may implement Natural Language Processing to analyze training code 312. For example, objective model 200 could implement a sequence-to-vector (seq2vec) encoder to encode training code 312 into one or more vectors and then map those vectors to one or more predicted tags 302. In another embodiment, objective model 200 may include an artificial neural network, and training engine 300 may implement a backpropagation approach to modify one or more weights included in objective model 200 to reduce an error between predicted tags 302 and training tags 314. Persons skilled in the art will understand that any technically feasible Machine Learning system can be used to implement objective model 200. Quality model 210 is generated based on some of the same training data as objective model 200, as described in greater detail below in conjunction with FIG. 4.

Figure 4:
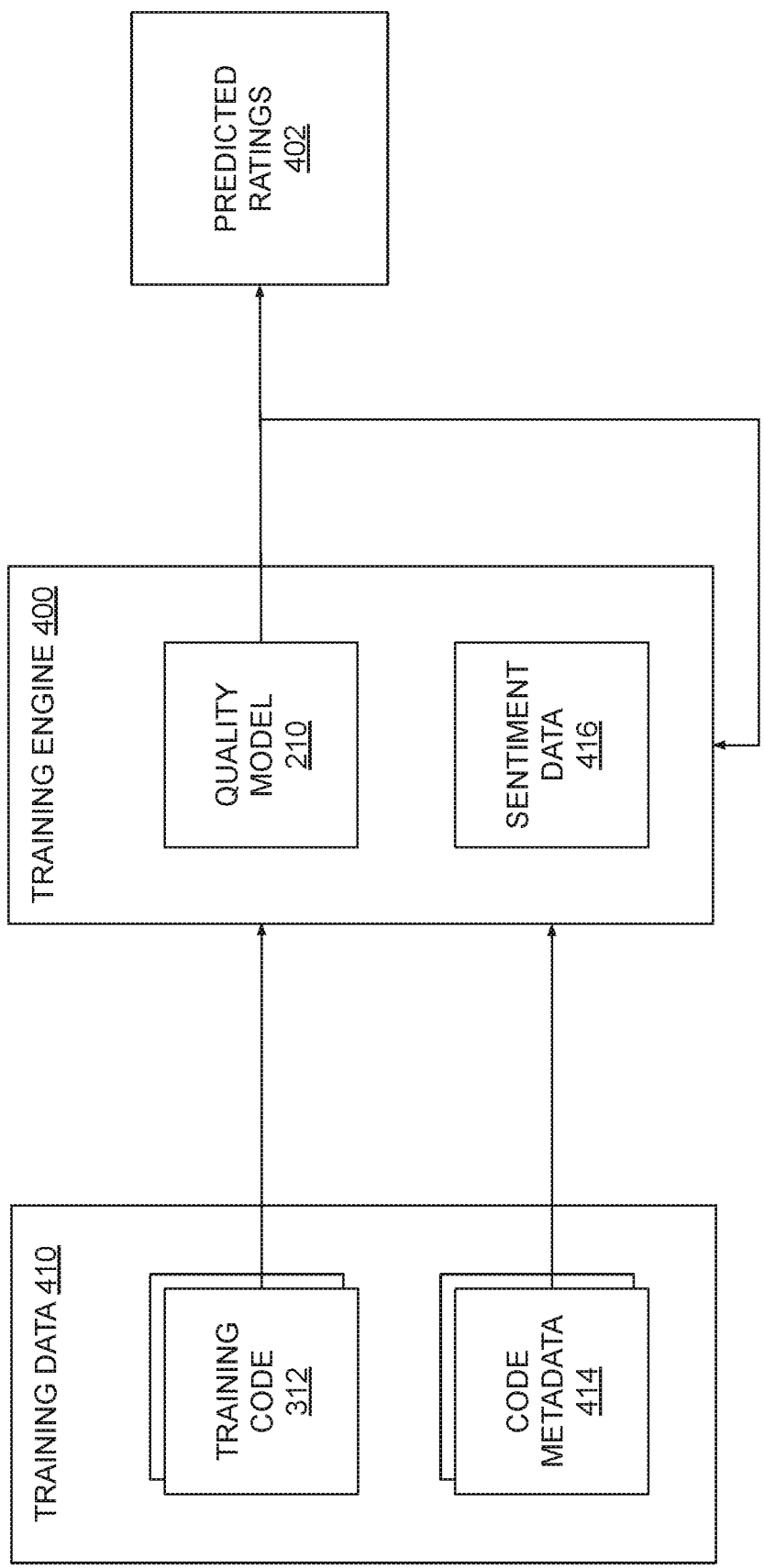
FIG. 4 illustrates how the quality model of FIG. 2 is generated via a series of training operations, according to various embodiments.

FIG. 4 illustrates how the quality model of FIG. 2 is generated via a series of training operations, according to various embodiments. As shown, a training engine 400 is configured to train quality model 210 based on training data 410. Training data 410 includes training code 312 of FIG. 3 as well as code metadata 414. Code metadata 414 includes human-generated text that is broadly related to training code 312 in some capacity. For example, code metadata 414 could be a functional description of training code 312, an explanation of the positive and negative attributes of training code 312, a comment, question, compliment, criticism, or other expression related to training code 312, an expression of some kind directed towards the author or a reader of training code 312, a description of a flaw associated with training code 312, an explanation of contexts where training code 312 should or should not be implemented, and so forth.

In one embodiment, code metadata 414 may be sourced from the publicly accessible Q&A websites mentioned above. A given Q&A website may permit users to post code samples along with descriptive text associated with those code samples. For example, a user could post a snippet of non-functional code along with a description of an error that occurs when the code is executed. In another example, a user could post a snippet of code in response to a programming question along with a description of how the posted code addresses the programming question. In yet another example, a user could post a comment to a posted snippet of code highlighting at least one of the strengths and weaknesses of the posted snippet of code. Code metadata 414 generally includes any text that is contextually relevant to a corresponding portion of training code 312.

During training, training engine 400 performs a sentiment analysis with code metadata 414 relative to different portions of training code 312 to determine the sentiment of users with respect to those portions of training code 312. Sentiment analysis provides one of the sources for the ratings: a code sample from a Q&A website with mainly negative sentiment in its description suggests that it is not advisable to deploy similar code to production environment; consequently, the rating of similar code will be low. Sentiment analysis includes a number of well-known computational techniques that generally fall within the field of Natural Language Processing. Accordingly, sentiment analysis is not described in detail here. Training engine 400 performs the sentiment analysis to generate sentiment data 416 for a given portion of training code 312. Sentiment data 416 rates the sentiment of users towards the given portion of training code 312 across one or more categories. Those categories may, in some embodiments, correspond to the various objectives associated with tags 202. An example of sentiment data 416 associated with a given portion of training code 312 is shown below in Table 1.

TABLE 1

| Category | Negative Sentiment | Zero Sentiment | Positive Sentiment |
| --- | --- | --- | --- |
| Python | 120 | 220 | 460 |
| Iterators | 570 | 30 | 50 |
| Multithreading | 140 | 80 | 450 |

As shown, training engine 400 determines that the given portion of training code 312 is regarded highly in the programming community as an example of code written in the Python programming language but is regarded poorly in the programming community as an example of proper usage of iterators. The portion of training code 312 also appears to exemplify a correct implementation of multithreading. Training engine 400 can implement any technically feasible form of sentiment analysis in order to determine the sentiment expressed in code metadata 414 relative to a set of possible categories. In one embodiment, training engine 400 weights the sentiment expressed by any given user towards a portion of code based on a reputation metric associated with the user.

In conjunction with performing the above sentiment analysis, training engine 400 also causes quality model 210 to analyze training code 312 to generate predicted ratings 402. Predicted ratings 402 are generally similar to sentiment data 416 but are generated by quality model 210 based solely on training code 312. Training engine 400 compares predicted ratings 402 to sentiment data 416 to determine the degree to which predicted ratings 402 are similar to sentiment data 416 for a given portion of training code 312. Training engine 400 then modifies quality model 210 in order to reduce an error or difference between predicted ratings 402 and sentiment data 416. Like objective model 200 discussed previously, quality model 210 is a Machine Learning model that can be modified through training to increase the accuracy with which ratings are generated.

In one embodiment, training engine 400 may implement Natural Language Processing to analyze code metadata 414 and generate sentiment data 416. For example, training engine 400 could implement a word-to-vector (seq2vec) encoder to perform a sentiment analysis with code metadata 414. In doing so, training engine 400 could encode code metadata 414 into a feature space and then identify regions of the feature space associated with positive sentiment and regions of the feature space associated with negative sentiment. In another embodiment, quality model 210 may also implement at least one of Natural Language Processing and Machine Learning techniques to generate predicted ratings 402. As a general matter, Persons skilled in the art will understand that any technically feasible Machine Learning system can be used to implement quality model 210 and that training engine 400 may implement any technically feasible training technique to train quality model 210.

Referring generally to FIGS. 3-4, via the above techniques, objective model 200 and quality model 210 are trained to generate tags 202 and ratings 212 that reflect the overarching purpose and quality associated with sample code 122, respectively. Performance model 220 can then estimate the performance of sample code 122 in a production environment based on tags 202 and ratings 212, as previously discussed. The training of performance model 220 is described in greater detail below in conjunction with FIG. 5.

Figure 5:
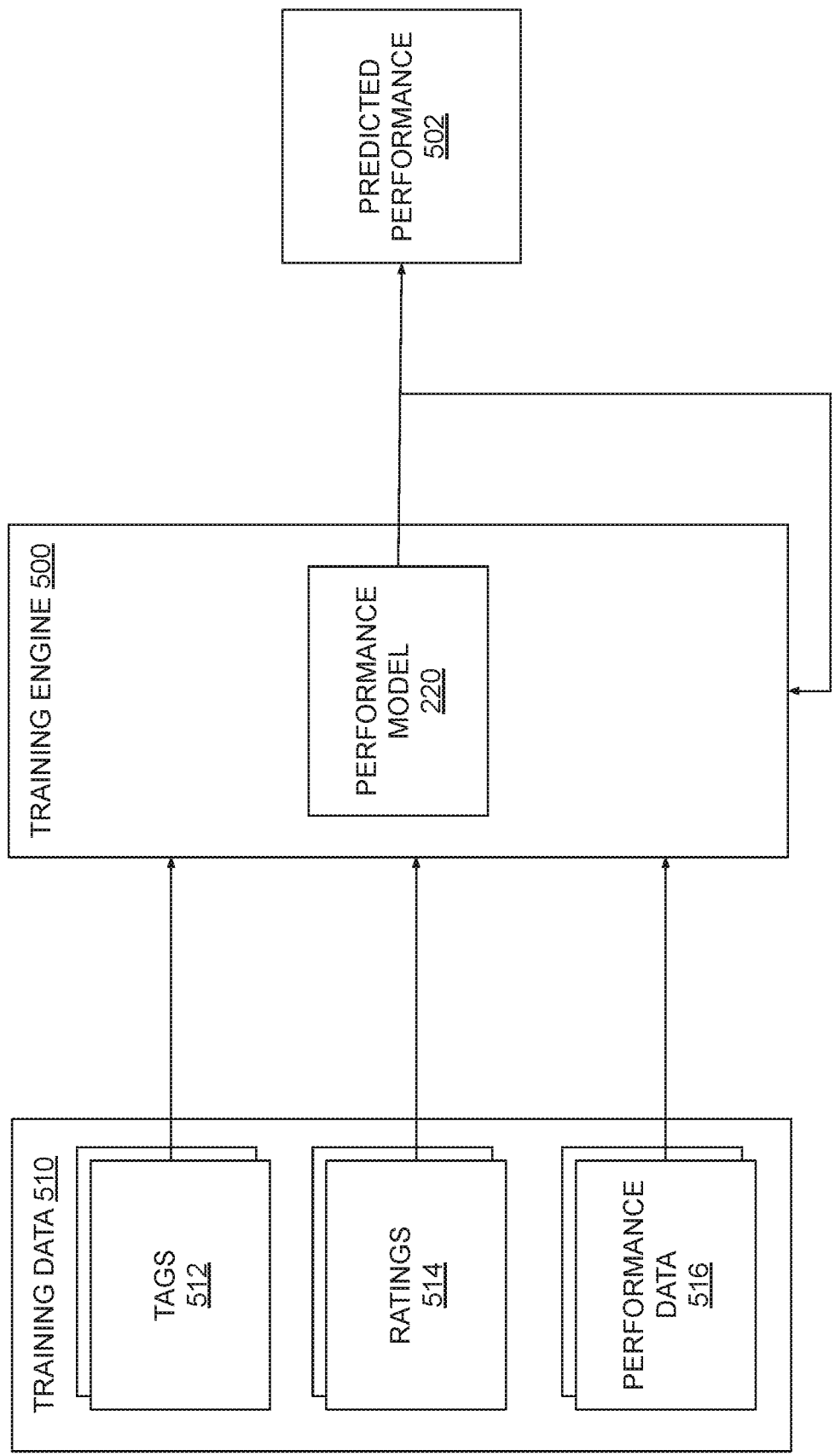
FIG. 5 illustrates how the performance model of FIG. 2 is generated via a series of training operations, according to various embodiments.

FIG. 5 illustrates how the performance model of FIG. 2 is generated via a series of training operations, according to various embodiments. As shown, a training engine 500 is configured to train performance model 220 based on training data 510. Training data 510 is generated based on a codebase that includes one or more code repositories and a version modification history associated with each code repository. For example, training data 510 could be generated based on a codebase that includes a Git repository along with a commit history associated with that Git repository.

Training data 510 includes tags 512, ratings 514, and performance data 516. Objective model 200 generates tags 512 based on a given portion of code included in the codebase using the technique described above in conjunction with FIGS. 2-3. Quality model 210 generates ratings 514 based on a given portion of code included in the codebase using the technique described above in conjunction with FIGS. 2 and 4. Performance data 516 is generated for a given portion of code included in the codebase by running one or more tests with the given portion of code within a production environment. Those tests could include, for example, unit tests, integration tests, and other types of tests. Performance data 516 includes data that describes the number of errors that occur when another system containing code of similar tags and ratings is executed, the duration of downtime associated with each error, and other metrics that reflect how code performs in a production environment. In one embodiment, performance data 516 may indicate a marked increase in the performance of a given portion of code that is correlated with a specific modification made to that portion of code.

During training, training engine 500 causes performance model 220 to analyze tags 512 and ratings 514 associated with a given portion of code to generate predicted performance 502. For example, training engine 500 could compute a weighted sum of values derived from tags 512 and ratings 514, where the weightings used are training via a Machine Learning approach. The analysis of the tags simply queries the database of other submitted code to find instances that have the same tag, but better quality rating. Training engine 500 compares predicted performance 502 to the performance data 516 associated with the given portion of code to determine the degree to which predicted performance 502 is similar to performance data 516. Training engine 500 then modifies performance model 220 in order to reduce an error or difference between predicted performance 502 and performance data 516. Performance model 220 is generally a Machine Learning model that is modified via training to increase the accuracy with which the performance of code can be predicted. In one embodiment, performance model 220 may be an artificial neural network that is trained via backpropagation based on the difference between predicted performance 502 and performance data 516.

Referring generally to FIGS. 3-5, the disclosed techniques for training objective model 200, quality model 210, and performance model 220 can be implemented with any technically feasible type of training data. For example, at least one of objective model 200 and quality model 210 could be trained based on code, tags, and metadata derived from one or more Q&A websites designed to help answer programming questions, as mentioned above. Performance model 220 could be trained based on different versions of code files included within one or more code repositories, as also mentioned above. As a general matter, any of the models described herein can be trained using any publicly or privately available source of program code and contextually relevant descriptions thereof and using any technically feasible training technique.

QC engine 120 implements objective model 200, quality model 210, and performance model 220 in order to characterize the purpose, quality, and performance of sample code 122 prior to sample code 122 being deployed to a production environment. Based on that characterization, QC engine 120 can map sample code 122 to example code 124 that potentially serves a similar purpose as sample code 122 but with a more robust and production-ready implementation. Various steps performed by QC engine 120 when generating example code 124 are described in greater detail below in conjunction with FIG. 6.

Procedure for Suggesting Example Code or Other Submitted Code

Figure 6:
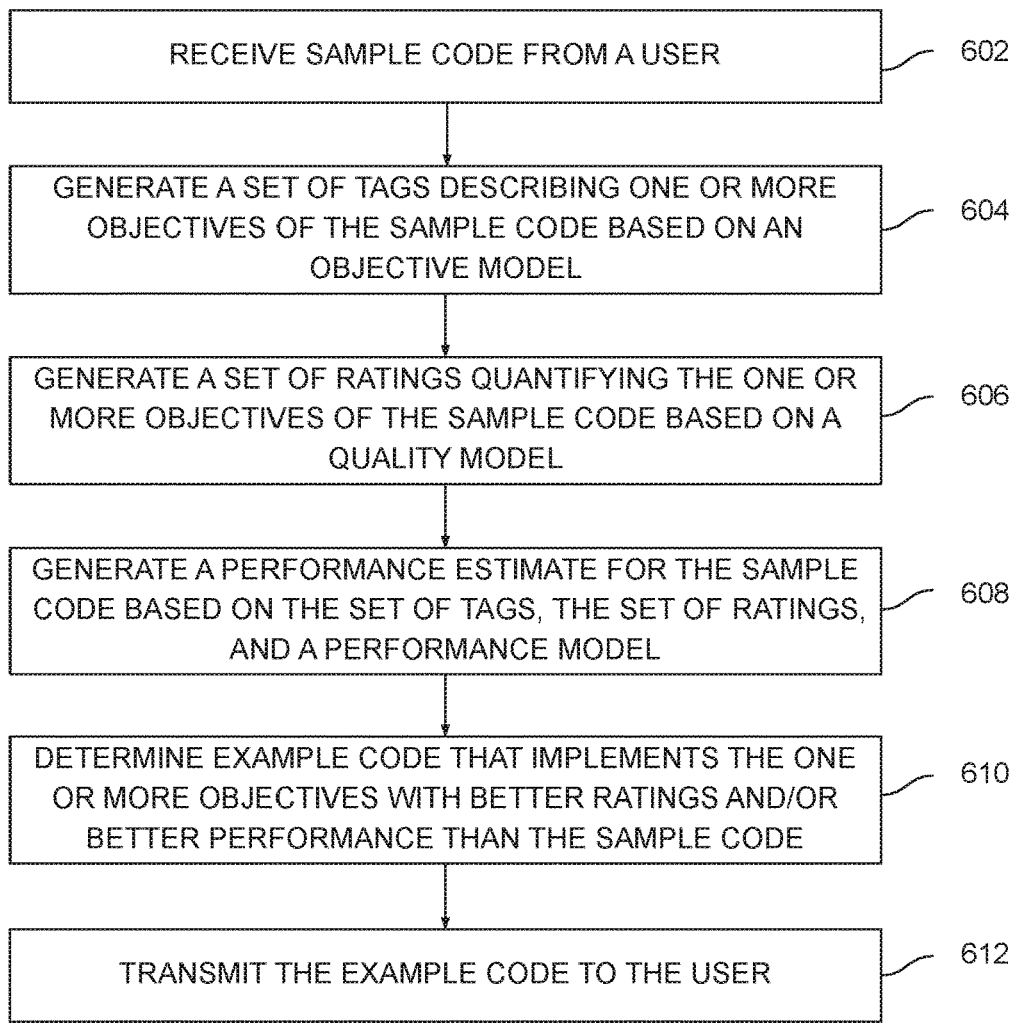
FIG. 6 is a flow diagram of method steps for generating and referencing example code that addresses a programming problem, according to various embodiments.

FIG. 6 is a flow diagram of method steps for suggesting example code that addresses a programming problem, according to various embodiments. Although the method steps are described in conjunction with the systems of FIGS. 1-5, persons skilled in the art will understand that any system configured to perform the method steps in any order falls within the scope of the present embodiments.

As shown, a method 600 begins at step 602, where QC engine 120 of FIG. 2 receives sample code 122 from a user. In one embodiment, QC engine 120 may generate and display GUI 126 to obtain sample code 122 from the user. GUI 126 could be, for example, a web page that allows the user to input and submit sample code 122. GUI 126 can be generated by either or both of client 110 and server 130.

At step 604, QC engine 120 generates a set of tags describing one or more objectives of sample code 122 based on objective model 200. Sample code 122 includes program code that is generated by a user to address a programming problem. The set of tags includes portions of text that describe various objectives of sample code 122. A given tag can also indicate one or more operations that sample code 122 performs, a programming language used to write sample code 122, a library used by sample code 122, and other attributes of sample code 122. Objective model 200 can be trained to generate tags that reflect objectives of code using the technique described above in conjunction with FIG. 3.

At step 606, QC engine 120 generates a set of ratings quantifying the one or more objectives of sample code 122 based on quality model 210. Each rating quantifies the degree to which sample code 122 achieves one of the objectives described via the set of tags generated at step 602. Quality model 210 is trained to quantify how well sample code 122 performs the different objectives via a training technique that involves performing a sentiment analysis on metadata associated with code to evaluate the quality of that code. Quality model 210 is then trained to recognize code that is considered "high" quality versus code that is considered "low" quality across a range of categories associated with the set of tags. Quality model 210 is trained to generate ratings based on code using the technique described above in conjunction with FIG. 4.

At step 608, QC engine 120 generates a performance estimate for sample code 122 based on the set of tags and the set of ratings generated at steps 602 and 604, respectively, and based on a performance model. The performance estimate includes metrics that reflect how well sample code 122 may perform when deployed to a production environment. For example, the performance estimate could indicate a predicted number of incidents over a time interval. Performance model 220 is trained to map sets of tags and sets of ratings to performance estimates based on tags and rating generated for code included in a codebase that is tested periodically to generate real performance data. Performance model 220 is trained to generate performance estimates for code using the technique described above in conjunction with FIG. 5.

At step 610, recommendation engine 230 within QC engine 120 determines example code 124 that implements the one or more objectives associated with sample code 122 with at least one of better ratings and better performance than sample code 122. In so doing, QC engine 120 queries database 118 to locate code that is associated with the set of tags and also associated with a set of ratings that exceeds those generated for sample code 122 and, in some instances, also associated with performance data that exceeds the performance estimate generated at step 608.

At step 612, QC engine 120 transmits example code or references to example code that better implements sample code 124 to the user. For example, QC engine 120 could provide example code 124 to the user via GUI 126. Alternatively, QC engine 120 can provide the same references in a format suitable for consumption by other computer systems. The computer-consumable output can be used to construct complex continuous integration pipelines. In this manner, QC engine 120 facilitates the user with guidance regarding how to perform various programming tasks in a manner that is accepted by the wider programming community. Further, QC engine 120 provides insight to the user regarding how to compose more robust and performant code that operates more effectively when deployed to a production environment than sample code 122.

In sum, various embodiments include a QC engine that analyzes sample code provided by a user and then generates example code that more effectively performs the same or similar operations performed by the sample code. The QC engine includes an objective model, a quality model, a performance model, and a recommendation engine. The objective model analyzes the sample code to generate one or more tags indicating the intended objective(s) of the sample code. The quality model analyzes the sample code to generate one or more ratings indicating the degree to which the sample code achieves each intended objective. The performance model analyzes the tags and the ratings and estimates the performance of the sample code when executed in a production environment. The recommendation engine queries a database of code based on the tags, the ratings, and the estimated performance of the sample code to determine example code that achieves the same or similar objectives(s) as the sample code, but with at least one of higher ratings and greater performance. The example code is provided to the user as guidepost for writing higher-quality code with greater performance.

At least one technological advantage of the disclosed techniques relative to the prior art is that the disclosed techniques enable at least one of higher quality and higher performance code to be generated when developing software applications. Among other things, the resulting code is less likely to contain programming bugs that potentially reduce performance when deployed to a production environment. In addition, the disclosed techniques provide computer programmers with more understanding about how to improve code that has been predicted to perform poorly, thereby providing a tool for computer programmers to debug software applications more quickly and more preemptively than is possible with prior art approaches. These technological advantages represent one or more technological advancements over prior art approaches.

1. Some embodiments include a computer-implemented method for determining source code that can replace defective portions of a software application, the method comprising determining a first objective for a first portion of program code, computing a first metric that indicates a degree to which the first portion of program code achieves the first objective, determining a second portion of program code based on the first objective and the first metric, wherein the second portion of program code is associated with a second metric that indicates a degree to which the second portion of program code achieves the first objective, and the second metric is greater than the first metric, and transmitting an identifier corresponding to the second portion of program code to a user.

2. The computer-implemented method of clause 1, wherein determining the first objective for the first portion of program code comprises determining at least one operation that is performed when the first portion of program code is executed.

3. The computer-implemented method of any of clauses 1-2, wherein determining the first objective for the first portion of program code comprises performing a Natural Language Processing operation using the first portion of program code to generate a first classification for the first portion of program code corresponding to the first objective.

4. The computer-implemented method of any of clauses 1-3, further comprising training a Machine Learning model to determine the first objective based on training data that includes one or more portions of program code and one or more tags, wherein a given tag included in the one or more tags indicates an objective associated with a given portion of program code included in the one or more portions of program code.

5. The computer-implemented method of any of clauses 1-4, wherein the Machine Learning model, once trained, is able to generate the one or more tags based on the one or more portions of program code.

6. The computer-implemented method of any of clauses 1-5, wherein computing the first metric comprises determining a number of syntactic elements included in the first portion of program code that are associated with the first objective.

7. The computer-implemented method of any of clauses 1-6, further comprising training a Machine Learning model to compute the first metric by performing a sentiment analysis using metadata associated with a third portion of program code to generate a sentiment value.

8. The computer-implemented method of any of clauses 1-7, wherein the Machine Learning model, once trained, is able to generate the sentiment value based on the third portion of code.

9. The computer-implemented method of any of clauses 1-8, further comprising computing a second metric that indicates an expected number of errors generated when the first portion of program code is executed in a production environment, wherein the second portion of program code is determined based further on the second metric.

10. The computer-implemented method of any of clauses 1-9, further comprising training a first Machine Learning model to compute the second metric based on performance data indicating a number of errors that occur when a third portion of program code is executed in the production environment, wherein the first Machine Learning model, once trained, is able to generate the performance data based on one or more objectives specified for the third portion of program code.

11. Some embodiments include a non-transitory computer-readable medium storing program instructions that, when executed by a processor, cause the processor to determine source code that can replace defective portions of a software application by performing the steps of determining a first objective that is at least partially achieved by a first portion of program code, computing a first metric that indicates a degree to which the first portion of program code achieves the first objective, determining a second portion of program code based on the first objective and the first metric, wherein the second portion of program code is associated with a second metric that indicates a degree to which the second portion of program code achieves the first objective, and the second metric is greater than the first metric, and transmitting an identifier corresponding to the second portion of program code to a user interface.

12. The non-transitory computer-readable medium of clause 11, wherein the step of determining the first objective for the first portion of program code comprises determining at least one function included in the first portion of program code.

13. The non-transitory computer-readable medium of any of clauses 11-12, wherein the step of determining the first objective for the first portion of program code comprises classifying the first portion of program code into at least one category corresponding to the first objective.

14. The non-transitory computer-readable medium of any of clauses 11-13, further comprising the step of training a first model to determine the first objective based on training data that includes one or more portions of program code and one or more tags, wherein a given tag included in the one or more tags indicates an objective associated with a given portion of program code included in the one or more portions of program code, wherein the first model, once trained, is able to generate the one or more tags based on the one or more portions of program code.

15. The non-transitory computer-readable medium of any of clauses 11-14, wherein the step of computing the first metric comprises determining a number of syntactic elements included in the first portion of program code that are associated with the first objective.

16. The non-transitory computer-readable medium of any of clauses 11-15, further comprising the step of training a first model to compute the first metric by performing a sentiment analysis using metadata associated with a third portion of program code to generate a sentiment value, wherein the first model, once trained, is able to generate the sentiment value based on the third portion of code.

17. The non-transitory computer-readable medium of any of clauses 11-16, further comprising the step of computing a second metric that indicates an expected number of errors generated when the first portion of program code is executed in a production environment, wherein the second portion of program code is determined based further on the second metric.

18. The non-transitory computer-readable medium of any of clauses 11-17, further comprising the step of training a first model to compute the second metric based on performance data indicating a number of errors that occur when a third portion of program code is executed in the production environment, wherein the first model, once trained, is able to generate the performance data based on one or more objectives specified for the third portion of program code.

19. The non-transitory computer-readable medium of any of clauses 11-18, wherein the step of determining the second portion of program code comprises querying a code database using the first objective to determine at least one portion of program code that meets the first objective to a greater degree than the first portion of program codes meets the first objective.

20. Some embodiments include a system, comprising a memory storing a software application, and a processor that, when executing the software application, is configured to perform the steps of determining a first objective for a first portion of program code, computing a first metric that indicates a degree to which the first portion of program code achieves the first objective, determining a second portion of program code based on the first objective and the first metric, wherein the second portion of program code is associated with a second metric that indicates that the second portion of program code achieves the first objective to a greater degree than the first portion of program code, and transmitting an identifier corresponding to the second portion of program code to a user interface.

21. The system of clause 20, wherein the reference to the second portion of program code comprise a uniform resource locator through which the second portion of program code can be accessed.

Any and all combinations of any of the claim elements recited in at least one of the claims and any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware technique, software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to at least one of the flowchart illustrations and block diagrams of methods, apparatus (systems) and computer program products according to embodiments of the disclosure. It will be understood that each block of the flowchart illustrations, each block of the block diagrams, and combinations of blocks in at least one of the flowchart illustrations and block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in at least one of the flowchart and block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block included in one or more of the block diagrams and flowchart illustration, and combinations of blocks in one or more of the block diagrams and flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for determining source code that can replace deficient portions of a software application, the method comprising:
   generating, using a machine learning model, output that indicates a first objective that is performed by a first portion of program code when the first portion of program code is executed;
   computing a first metric that indicates a degree to which the first portion of program code achieves the first objective when the first portion of program code is executed;
   determining a second portion of program code based on the first objective and the first metric, wherein the second portion of program code is associated with a second metric that indicates a degree to which the second portion of program code achieves the first objective when the second portion of program code is executed, and the second metric is greater than the first metric; and
   transmitting an identifier corresponding to the second portion of program code to a user.

2. The computer-implemented method of claim 1, wherein the output indicates at least one operation that is performed when the first portion of program code is executed.

3. The computer-implemented method of claim 1, wherein the output comprises a first classification for the first portion of program code corresponding to the first objective.

4. The computer-implemented method of claim 1, further comprising training the machine learning model to generating the output indicating the first objective based on training data that includes one or more portions of program code and one or more tags, wherein a given tag included in the one or more tags indicates an objective associated with a given portion of program code included in the one or more portions of program code.

5. The computer-implemented method of claim 4, wherein the machine learning model, once trained, is able to generate the one or more tags based on the one or more portions of program code.

6. The computer-implemented method of claim 1, wherein computing the first metric comprises determining a number of syntactic elements included in the first portion of program code that are associated with the first objective.

7. The computer-implemented method of claim 1, further comprising training a second machine learning model to compute the first metric by performing a sentiment analysis using metadata associated with a third portion of program code to generate sentiment data.

8. The computer-implemented method of claim 7, wherein the second machine learning model, once trained, is able to generate a predicted rating based on the third portion of code.

9. The computer-implemented method of claim 1, further comprising computing a third metric that indicates an expected number of errors generated when the first portion of program code is executed in a production environment, wherein the second portion of program code is determined based further on the third metric.

10. The computer-implemented method of claim 9, further comprising training a second machine learning model to compute the third metric based on performance data indicating a number of errors that occur when a third portion of program code is executed in the production environment, wherein the second machine learning model, once trained, is able to generate the performance data based on one or more objectives specified for the third portion of program code.

11. A non-transitory computer-readable medium storing program instructions that, when executed by a processor, cause the processor to determine source code that can replace deficient portions of a software application by performing the steps of:
   generating, using a machine learning model, output that indicates a first objective that is at least partially performed by a first portion of program code when the first portion of program code is executed;
   computing a first metric that indicates a degree to which the first portion of program code achieves the first objective when the first portion of program code is executed;
   determining a second portion of program code based on the first objective and the first metric, wherein the second portion of program code is associated with a second metric that indicates a degree to which the second portion of program code achieves the first objective when the second portion of program code is executed, and the second metric is greater than the first metric; and
   transmitting an identifier corresponding to the second portion of program code to a user interface.

12. The non-transitory computer-readable medium of claim 11, wherein the output indicates at least one function included in the first portion of program code.

13. The non-transitory computer-readable medium of claim 11, wherein the step of generating the output indicating the first objective performed by the first portion of program code comprises classifying the first portion of program code into at least one category corresponding to the first objective.

14. The non-transitory computer-readable medium of claim 11, further comprising the step of training the machine learning model to generate the output indicating the first objective based on training data that includes one or more portions of program code and one or more tags, wherein a given tag included in the one or more tags indicates an objective associated with a given portion of program code included in the one or more portions of program code, wherein the first model, once trained, is able to generate the one or more tags based on the one or more portions of program code.

15. The non-transitory computer-readable medium of claim 11, wherein the step of computing the first metric comprises determining a number of syntactic elements included in the first portion of program code that are associated with the first objective.

16. The non-transitory computer-readable medium of claim 11, further comprising the step of training a second machine learning model to compute the first metric by performing a sentiment analysis using metadata associated with a third portion of program code to generate sentiment data, wherein the first model, once trained, is able to generate a predicted rating based on the third portion of code.

17. The non-transitory computer-readable medium of claim 11, further comprising the step of computing a third metric that indicates an expected number of errors generated when the first portion of program code is executed in a production environment, wherein the second portion of program code is determined based further on the third metric.

18. The non-transitory computer-readable medium of claim 17, further comprising the step of training a second machine learning model to compute the third metric based on performance data indicating a number of errors that occur when a third portion of program code is executed in the production environment, wherein the second machine learning model, once trained, is able to generate the performance data based on one or more objectives specified for the third portion of program code.

19. The non-transitory computer-readable medium of claim 11, wherein the step of determining the second portion of program code comprises querying a code database using the first objective to determine at least one portion of program code that meets the first objective to a greater degree than the first portion of program codes meets the first objective.

20. A system, comprising:
a memory storing a software application; and
a processor that, when executing the software application, is configured to perform the steps of:
generating, using a machine learning model, output indicating a first objective that is performed by a first portion of program code when the first portion of program code is executed,
computing a first metric that indicates a degree to which the first portion of program code achieves the first objective when the first portion of program code is executed,
determining a second portion of program code based on the first objective and the first metric, wherein the second portion of program code is associated with a second metric that indicates that the second portion of program code, when executed, achieves the first objective to a greater degree than the first portion of program code when the first portion of program code is executed, and
transmitting an identifier corresponding to the second portion of program code to a user interface.

21. The system of claim 20, wherein the identifier corresponding to the second portion of program code comprise a uniform resource locator through which the second portion of program code can be accessed.

* * * * *